UNITED STATES PATENT OFFICE.

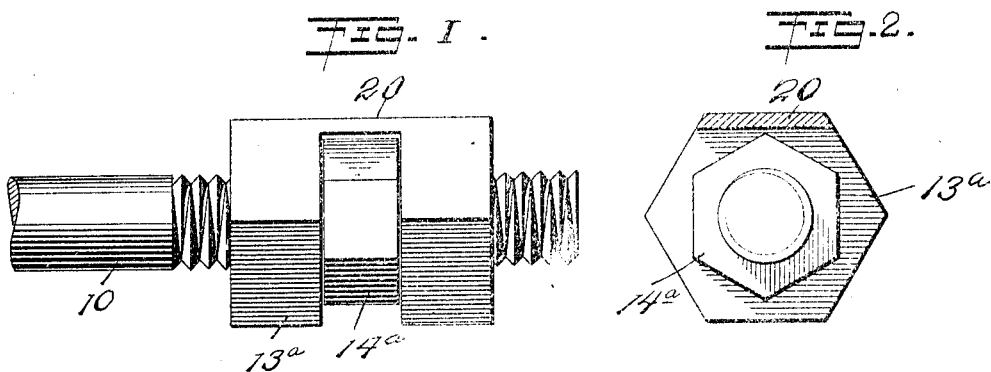

ALEXANDER GOLDSMAN, OF NEW YORK, N. Y., ASSIGNOR OF ONE-HALF TO AUGUSTA MATZNER, OF NEW YORK, N. Y.

BOLT AND NUT.

1,035,118.  Specification of Letters Patent.  Patented Aug. 6, 1912.

Application filed September 15, 1911. Serial No. 649,571.

*To all whom it may concern:*

Be it known that I, ALEXANDER GOLDSMAN, of the city, county, and State of New York, have invented a new and useful Improvement in Bolts and Nuts, of which the following is a specification.

This invention relates to bolts and nuts, the object being to prevent the nut or the bolt from loosening. To accomplish this I employ a bolt having a double thread, and two nuts, or internally-threaded structures, the nuts being coupled together so that they cannot separate.

In the accompanying drawings illustrating my invention, Figure 1 is a side elevation, and Fig. 2 is an end view thereof.

Figs. 1 and 2 show means whereby the nuts are coupled together in such manner that separation thereof is prevented while simultaneous rotation thereof in opposite directions is permitted. In the construction illustrated the nut 13$^a$ which may be the right-hand threaded nut, is formed of two spaced sections joined by a bridge-piece 20, which may or may not be integral with the sections. The nut 14$^a$ which may be the left-hand threaded nut is formed so as to fit into the space between the sections of the nut 13$^a$. The formation of the two nuts is such that they may be simultaneously rotated in opposite directions, thus enabling them to be screwed onto or off from the bolt. It is obvious that the nut 13$^a$ may be two separate nuts, having threads of the same character and connected together by suitable means. In other words, this may be regarded as a two-nut structure, or as a three-nut structure.

For the purposes of my invention, it is not necessary to have a right and left-hand thread, for two right or two left-hand threads on the same bolt will accomplish the same work. If there are two threads having the same direction they must be of a different pitch. For instance, if one thread makes two revolutions per inch, the second thread must make four revolutions per inch.

Having thus described my invention, what I claim as new is:

1. The combination of a bolt having both right- and left-hand threads occupying the same region, two nuts having threads of the same character, with means coupling them together in spaced relation, and a nut oppositely-threaded fitting into the space between the aforesaid nuts.

2. The combination of a bolt having both right- and left-hand threads occupying the same region, a nut comprising two spaced sections and a bridge-piece connecting them together, and an oppositely-threaded nut received between said sections.

In witness whereof, I have hereunto set my hand this 13th day of September, 1911.

ALEXANDER GOLDSMAN.

In the presence of—
A. MATZNER,
CLARENCE G. GALSTON.